(12) United States Patent
Tanaka et al.

(10) Patent No.: US 9,809,874 B2
(45) Date of Patent: Nov. 7, 2017

(54) STEEL SHEET SUITABLE FOR IMPACT ABSORBING MEMBER AND METHOD FOR ITS MANUFACTURE

(71) Applicant: NIPPON STEEL & SUMITOMO METAL CORPORATION, Tokyo (JP)

(72) Inventors: Yasuaki Tanaka, Tokyo (JP); Kaori Kawano, Tokyo (JP); Masahito Tasaka, Tokyo (JP); Yoshiaki Nakazawa, Tokyo (JP); Takuya Nishio, Tokyo (JP); Masayuki Wakita, Tokyo (JP); Jun Haga, Tokyo (JP); Toshiro Tomida, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 363 days.

(21) Appl. No.: 14/391,215

(22) PCT Filed: Apr. 8, 2013

(86) PCT No.: PCT/JP2013/060625
§ 371 (c)(1),
(2) Date: Oct. 8, 2014

(87) PCT Pub. No.: WO2013/154071
PCT Pub. Date: Oct. 17, 2013

(65) Prior Publication Data
US 2015/0075680 A1  Mar. 19, 2015

(30) Foreign Application Priority Data

Apr. 10, 2012 (JP) ................................ 2012-088944
Apr. 10, 2012 (JP) ................................ 2012-088945

(51) Int. Cl.
| | |
|---|---|
| *C22C 38/38* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C22C 38/22* | (2006.01) |
| *C22C 38/24* | (2006.01) |
| *C22C 38/26* | (2006.01) |

(Continued)

(52) U.S. Cl.
CPC ............... *C22C 38/38* (2013.01); *C21D 1/20* (2013.01); *C21D 1/26* (2013.01); *C21D 8/0236* (2013.01); *C21D 8/0263* (2013.01); *C21D 8/0436* (2013.01); *C21D 8/0463* (2013.01); *C21D 8/0473* (2013.01); *C21D 9/46* (2013.01); *C21D 9/48* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/24* (2013.01); *C22C 38/26* (2013.01); *C22C 38/28* (2013.01); *C22C 38/32* (2013.01); *C21D 2211/001* (2013.01); *C21D 2211/002* (2013.01); *C21D 2211/005* (2013.01); *C21D 2211/008* (2013.01)

(58) Field of Classification Search
CPC ... C22C 38/001; C22C 38/002; C22C 38/005; C22C 38/02; C22C 38/04; C22C 38/06; C22C 38/12; C22C 38/14; C22C 38/22; C22C 38/24; C22C 38/26; C22C 38/28; C22C 38/32; C22C 38/38; C21D 1/20; C21D 1/26; C21D 8/0236; C21D 8/0263; C21D 8/0436; C21D 8/0463; C21D 1/0473; C21D 9/46; C21D 9/48; C21D 2211/001; C21D 2211/002; C21D 2211/005; C21D 2211/008
See application file for complete search history.

(56) References Cited

FOREIGN PATENT DOCUMENTS

| | | |
|---|---|---|
| EP | 1 990 431 | 11/2008 |
| JP | 11-080879 | 3/1999 |

(Continued)

OTHER PUBLICATIONS

Nishio et al., English machine translation of JP 2012-012656, Jan. 2012, p. 1-28.*

(Continued)

*Primary Examiner* — Roy King
*Assistant Examiner* — Caitlin Kiechle
(74) *Attorney, Agent, or Firm* — Clark & Brody

(57) ABSTRACT

A steel sheet suitable as a starting material for a vehicle impact absorbing member with high absorption of impact energy and resistance to cracking contains, by mass %, C: 0.08-0.30%, Mn: 1.5-3.5%; Si+Al: 0.50-3.0%, P: 0.10% or less, S: at most 0.010%, and N: at most 0.010%, and optionally, one or more types selected from Cr: at most 0.5%, Mo: at most 0.5%, B: at most 0.010%, Ti: less than 0.04%, Nb: less than 0.030%, V: less than 0.5%, Ca: at most 0.010%, Mg: at most 0.010%, REM: at most 0.050%, and Bi: at most 0.050%. The microstructure contains, by area %, bainite: more than 50%, martensite: 3-30%, and retained austenite: 3-15%, the remainder comprising ferrite having an average grain diameter of less than 5 mm. The product of uniform elongation and hole expansion ratio is at least $300\%^2$ and 5% effective flow stress is at least 900 MPa.

5 Claims, 2 Drawing Sheets

(51) Int. Cl.

| | |
|---|---|
| *C22C 38/28* | (2006.01) |
| *C21D 8/04* | (2006.01) |
| *C21D 9/48* | (2006.01) |
| *C21D 1/20* | (2006.01) |
| *C21D 1/26* | (2006.01) |
| *C21D 8/02* | (2006.01) |
| *C21D 9/46* | (2006.01) |
| *C22C 38/32* | (2006.01) |

(56) References Cited

FOREIGN PATENT DOCUMENTS

| JP | 11-269606 | 10/1999 |
|---|---|---|
| JP | 2000-017385 | 1/2000 |
| JP | 2002-060898 | 2/2002 |
| JP | 2004-084074 | 3/2004 |
| JP | 2004-277858 | 10/2004 |
| JP | 2006-161077 | 6/2006 |
| JP | 2011-140686 | 7/2011 |
| JP | 2011-140687 | 7/2011 |
| JP | 2011-140688 | 7/2011 |
| JP | 2011-144404 | 7/2011 |
| JP | 2012-001773 | 1/2012 |
| JP | 2012-012656 | 1/2012 |
| JP | 2012-255176 | 12/2012 |
| JP | 2013-032580 | 2/2013 |

OTHER PUBLICATIONS

"Microalloyed Steel", May 31, 2006, and partial English translation.
"Ultra-Fine Grained Steels", Sep. 30, 2003, and partial English translation.
"Advanced Methods for Materials Characterization", Aug. 31, 2007, and partial English translation.
"Advanced Automotive Steel", Jan. 31, 2008, and partial English translation.
Zuyao Hu et al., "High Manganese Steel Casting Production and Application Examples", Chemical Industry Press, May 2010.

* cited by examiner

STEEL SHEET SUITABLE FOR IMPACT ABSORBING MEMBER AND METHOD FOR ITS MANUFACTURE

TECHNICAL FIELD

The present invention relates to a steel sheet and an impact absorbing member, and to a method for its manufacture. More specifically, the present invention relates to a steel sheet having a high effective flow stress and being suitable as a starting material for an impact absorbing member in which occurrence of cracking when subjected to an impact load is suppressed, a method for its manufacture, and an impact absorbing member made of the steel sheet.

BACKGROUND ART

In recent years, in order to protect global environmental, weight reduction of automobile bodies is demanded as a measure to decrease the amount of $CO_2$ discharged from automobiles. For the purpose, increases in the strength of steel sheets for automobiles are required. This is because increase in the strength of steel sheet will allow decrease of the thickness of steel sheets for automobiles, thereby decreasing the weight of automotive bodies.

On the other hand, there are increased demands by society for safety of automobiles in collisions. Accordingly, there is a need for not only simply increasing the strength of steel sheet, but also developing a steel sheet having improved impact resistance upon collision during driving. Since each portion of a member for an automobile is subjected to deformation at a high strain rate of several 10 s to $10^3$/s in collision, a high strength steel sheet having improved dynamic strength properties is required for automobile use.

As a high strength steel sheet having improved dynamic strength properties, there are known high-strength multi-phase structure steel sheets including a low-alloy TRIP steel sheet (strain induced transformation type high-strength steel sheet) which has a high static-dynamic difference (difference between static strength and dynamic strength) and a multi-phase structure steel sheet having a second phase primarily including martensite.

Regarding the low-alloy TRIP steel sheet, for example, Patent Document 1 discloses a strain induced transformation-type high-strength steel sheet having improved dynamic deformation properties and for absorbing automobile collision energy.

Prior art examples relating to the high-strength multi-phase structure steel sheet having a second phase primarily including martensite include the following Patent Documents.

Patent Document 2 discloses a high-strength steel sheet having improved balance of strength and ductility, and a static-dynamic difference of at least 170 MPa, and a method for its manufacture, wherein the steel sheet has a multi-phase structure comprising a ferrite phase and a hard second phase dispersed therein, in which the average grain diameter ds of nano crystal grains having a grain diameter of at most 1.2 μm and an average grain diameter dL of micro crystal grains having a grain diameter exceeding 1.2 μm in the ferrite phase satisfy a relationship of dL/ds≥3.

Patent Document 3 discloses a hot-rolled steel sheet having a high static-dynamic ratio, and a method for producing the same, wherein the steel sheet has a dual-phase structure of martensite having an average grain diameter of at most 3 μm and ferrite having an average grain diameter of at most than 5 μm.

Patent Document 4 discloses a cold-rolled steel sheet having improving impact absorbing properties, and a method for its manufacture, wherein the steel sheet has a dual-phase structure, which contains at least 75% of ferrite phase having an average grain diameter of at most 3.5 μm, the remainder being tempered martensite.

Patent Document 5 discloses a cold-rolled steel sheet having a static-dynamic difference of at least 60 MPa at a strain rate of $5 \times 10^2$ to $5 \times 10^3$/s, and a method for its manufacture, wherein the steel sheet is made to have a dual-phase structure of ferrite and martensite by pre-straining.

Patent Document 6 discloses a high-strength hot-rolled steel sheet having improved impact resistant properties, wherein the steel sheet has a dual-phase structure of at least 85% of bainite and a hard phase such as martensite.

CITATION LIST

Patent Document

Patent Document 1: Japanese Patent Laid-Open No. 11-80879
Patent Document 2: Japanese Patent Laid-Open No. 2006-161077
Patent Document 3: Japanese Patent Laid-Open No. 2004-84074
Patent Document 4: Japanese Patent Laid-Open No. 2004-277858
Patent Document 5: Japanese Patent Laid-Open No. 2000-17385
Patent Document 6: Japanese Patent Laid-Open No. 11-269606

SUMMARY OF INVENTION

To improve impact absorbing properties of an impact absorbing member, it is effective to increase the strength of the steel sheet of the starting material for the impact absorbing member. That is, increasing the strength of steel sheet allows not only the decrease of thickness (decrease of weight), but also the increase of absorbed impact energy. This is because as the strength of the starting material for the steel sheet increases, flow stress required for plastic deformation increases. Since, an impact absorbing member generally absorbs energy produced by a collision through its plastic deformation caused by the collision, increasing its strength tends to increase the impact absorbing capability.

However, the impact energy which can be absorbed by an impact absorbing member greatly depends on the thickness of the steel sheet of the starting material. This is obvious, for example, from the fact that the following relationship about an average load ($F_{ave}$) that determines the absorption of impact energy of steel sheet holds as shown in Journal of Japan Society for Technology of Plasticity, vol. 46, No. 534, p. 641-645.

$$F_{ave} \propto (\sigma_Y t^2)/4$$

(Where, $\sigma_Y$: effective flow stress, and t: sheet thickness.)

The effective flow stress means a flow stress at a particular value of strain.

That is, the average load ($F_{ave}$) is in direct proportion to the square of the sheet thickness t. Therefore, both a decreased thickness and a high impact absorbing capability for an impact absorbing member only by increasing the strength of steel sheet can be achieved only to some extent.

On the other hand, the absorption of impact energy of an impact absorbing member also greatly depends on its shape.

This is disclosed in, for example, International Publication Nos. 2005/010396, 2005/010397, and 2005/010398.

Therefore, there is possibility to rapidly increase the absorption of impact energy of an impact absorbing member to a level which cannot be achieved simply by increasing the strength of steel sheet, by optimizing the shape of the impact absorbing member so as to increase the plastic deformation work when subjected to impact by collision.

However, even if the shape of the impact absorbing member is optimized so as to increase the amount of plastic deformation work, a crack would have occurred in the impact absorbing member in an early period before the desired plastic deformation is completed upon collision of automobile unless the steel sheet has deformation capability to be able to endure the amount of plastic deformation work. As a result of that, it is not possible to increase the amount of plastic deformation work of the impact absorbing member and therefore not possible to rapidly increase the absorption of impact energy thereof. Moreover, if a crack occurs in the impact absorbing member in an early period, an unexpected situation may be brought about in which another member disposed adjacent to this impact absorbing member is damaged.

As shown in the above described Patent Documents, conventionally, the dynamic strength of steel sheet has been increased based on the technical concept that the absorption of impact energy of the impact absorbing member depends on the dynamic strength (the static-dynamic difference or static-dynamic ratio) of steel sheet. However, simply increasing the dynamic strength of steel sheet may significantly deteriorate deformation properties. For that reason, even if the shape of the impact absorbing member is optimized so as to increase the amount of plastic deformation work, it is not necessarily possible to dramatically increase the impact energy absorbed by the impact absorbing member.

Further, since conventionally the shape of the impact absorbing member has been studied on the assumption that the steel sheet manufactured based on the above described technical concept is used, the optimization of the shape of the impact absorbing member has been studied from the beginning on the assumption of deformation capability of conventional steel sheets. For that reason, sufficient study has not been done from the perspective of improving the deformation capability of steel sheet as well as optimizing the shape of the impact absorbing member so as to improve the amount of plastic deformation work.

As described above, to improve the absorption of impact energy of the impact absorbing member, it is important to optimize the shape of the impact absorbing member, in addition to increase the strength of steel sheet so as to increase the amount of plastic deformation work.

Regarding steel sheet, it is important to increase an effective flow stress to optimize the shape of the impact absorbing member, which can increase the amount of plastic deformation work. Increasing the effective flow stress of steel sheet will make it possible to increase the amount of plastic deformation work of steel sheet, while suppressing the occurrence of cracking when subjected to an impact load.

In order to improve the absorption of impact energy of the impact absorbing member, the present inventors have studied on steel sheet regarding the means of suppressing the occurrence of cracking when subjected to an impact load, and concurrently allowing the effective flow stress to be increased, and thus obtained new findings listed below.

(A) To improve the absorption of impact energy of an impact absorbing member, it is effective to increase the effective flow stress (hereafter, referred to as "5% flow stress") when a true strain of 5% is applied to the steel sheet of the starting material.

(B) To suppress the occurrence of cracking in the impact absorbing member when subjected to an impact load, it is effective to improve uniform elongation and local ductility of the steel sheet of the starting material.

(C) To increase the 5% flow stress of steel sheet, it is effective to increase yield strength thereof and a work hardening coefficient in a low strain region.

(D) To increase the yield strength and the work hardening coefficient in a low strain region of steel sheet, it is necessary that the steel structure of steel sheet has a multi-phase structure containing bainite as the main phase, and martensite which is harder than bainite and retained austenite in a second phase.

(E) The martensite and retained austenite contained in the second phase of the multi-phase structure contribute to increases of the work hardening coefficient and uniform elongation in a low strain range of steel sheet. Therefore, it is necessary to set lower limits for the area fractions of martensite and retained austenite.

(F) On the other, excessive large area fractions of martensite and retained austenite will lead to decrease of local ductility of steel sheet. Therefore, it is necessary to set upper limits for the area fractions of martensite and retained austenite.

(G) If the ferrite which is a retained structure is coarse, strain is likely to be concentrated in soft ferrite, and thereby decreases the yield strength of steel sheet and the local ductility thereof. Therefore, it is necessary to specify upper limit for the average grain diameter of ferrite.

(H) As described above, to improve the absorption of impact energy of an impact absorbing member, it is effective to increase the 5% flow stress of steel sheet; and to suppress the occurrence of cracking of the member when subjected to an impact load, it is effective to improve the uniform elongation and the local ductility of steel sheet. To respond to severe needs in recent years, as an index to realize these, it is necessary that the product of uniform elongation and hole expansion ratio is at least 300%$^2$, and the effective flow stress when applied with 5% true strain is at least 900 MPa in steel sheet.

(I) Appropriately suppressing the hardness ratio between the bainite which is the main phase and the martensite contained in the second phase will suppress mobile dislocation by plastic deformation, thus making it easy to achieve higher yield strength. Therefore, it is preferable to set upper limit for the hardness ratio between the bainite which is the main phase and the martensite.

(J) On the other hand, appropriately improving the hardness ratio between the bainite which is the main phase and the martensite contained in the second phase will make it easy to increase the work hardening coefficient and uniform elongation in a low strain region by including martensite. Therefore it is preferable to set a lower limit for the hardness ratio between the bainite which is the main phase and the martensite.

(K) Suppressing strain concentration by plastic deformation only in bainite and work hardening in a multi-phase structure steel sheet containing bainite as the main phase will suppress the occurrence of cracking along a shear band and a grain boundary in the bainite, making it easy to improve the local ductility. On the other hand, suppressing excessive hardening of the second phase caused by plastic deformation makes it possible to avoid that the hardness difference between the main phase and the second phase increases so that occurrence of cracking from an interface therebetween is suppressed, thus making it easy to increase the local ductility of steel sheet.

Therefore, to achieve even higher local ductility in a multi-phase structure steel sheet containing bainite as the main phase, it is preferable to cause strain to be appropriately distributed between bainite which is the main phase and the second phase. That is, it is preferable that bainite which is the main phase and the second phase are subjected to a same level of work hardening when plastically deformed. As an index for this, it is appropriate to use a proportion of work hardening rates after 10% tensile deformation. That is, in a multi-phase structure steel sheet containing bainite as the main phase and martensite in a second phase, it is preferable to set a lower limit and an upper limit for the ratio between the work hardening rate of bainite after 10% tensile deformation and the work hardening rate of martensite after 10% tensile deformation.

(L) A steel sheet having the above described microstructure can be obtained by combining a specific chemical composition, a hot rolling condition, a cold rolling condition and an annealing condition as will be described later in detail.

The present invention based on the above described new findings is a steel sheet comprising: a chemical composition containing, by mass %, C: at least 0.08% and at most 0.30%, Mn: at least 1.5% and at most 3.5%, Si+Al: at least 0.50% and at most 3.0%, P: at most 0.10%, S: at most 0.010%, N: at most 0.010%, Cr: 0 to at most 0.5%, Mo: 0 to at most 0.5%, B: 0 to at most 0.01%, Ti: 0 to less than 0.04%, Nb: 0 to less than 0.030%, V: 0 to less than 0.5%, Ca: 0 to at most 0.010%, Mg: 0 to at most 0.010%, REM: 0 to at most 0.050%, and Bi: 0 to at most 0.050%, the remainder being Fe and impurities; a microstructure containing, by area %, bainite: more than 50%, martensite: at least 3% and at most 30%, and retained austenite: at least 3% and at most 15%, the remainder consisting of ferrite having an average grain diameter of less than 5 μm; and mechanical properties in which the product of uniform elongation and hole expansion ratio is at least 300%$^2$, and an effective flow stress when 5% true strain is applied is at least 900 MPa.

Here, the "effective flow stress when 5% true strain is applied" means the flow stress required to keep plastic deformation occurring when 5% true strain is applied and then plastic deformation is started. This effective flow stress can be determined from a true stress value at a true strain of 5% in a true stress-true strain curve obtained by a simple tension test.

The microstructure preferably satisfies the following formulas (1) and (2):

$$1.2 \le H_{M0}/H_{B0} \le 1.6 \quad (1)$$

$$0.9 \le \{(H_{M10}/H_{M0})/(H_{B10}/H_{B0})\} \le 1.3 \quad (2)$$

where,
$H_{M0}$: initial average nano hardness of the martensite,
$H_{B0}$: initial average nano hardness of the bainite,
$H_{M10}$: average nano hardness of the martensite after 10% tensile deformation,
$H_{B10}$: average nano hardness of the bainite after 10% tensile deformation.

The average nano hardness can be determined by the method according to Examples. The initial average nano hardness means a nano hardness before tensile deformation is applied.

The chemical composition may contain one or more selected from by mass %, Cr: at least 0.1% and at most 0.5%, Mo: at least 0.1% and at most 0.5%, B: at least 0.0010% and at most 0.010%, Ti: at least 0.01% and less than 0.04%, Nb: at least 0.005% and less than 0.030%, V: at least 0.010% and less than 0.5%, Ca: at least 0.0008% and at most 0.010%, Mg: at least 0.0008% and at most 0.010%, REM: at least 0.0008% and at most 0.050%, and Bi: at least 0.0010% and at most 0.050%.

In another aspect, the present invention is an impact absorbing member having an impact absorbing portion, which absorbs impact energy by being axially crashed and buckled, wherein the impact absorbing portion is made of any of the above described steel sheets.

In a further aspect, the present invention is a method for manufacturing a steel sheet, comprising following steps (A) to (c):

(A) a hot rolling step in which a slab having the above described chemical composition is subjected to multi-pass hot rolling in which rolling is completed at a temperature of at least Ar$_3$ point, the obtained steel sheet is cooled to a temperature range of at least 620° C. and at most 720° C. under a cooling condition in which cooling is started within 0.4 seconds after completion of rolling, and an average cooling rate is at least 600° C./sec, as well as a time required for cooling from completion of rolling in a rolling pass which is two passes before the last rolling pass to 720° C. is at most 4 seconds, and the steel sheet is held in the temperature range for at least 1 second and at most 10 seconds, thereafter being cooled to a temperature range of at least 300° C. and at most 610° C. at an average cooling rate of at least 10° C./sec and at most 100° C./sec, and being coiled to obtain a hot-rolled steel sheet;

(B) a cold rolling step in which the hot-rolled steel sheet obtained by the hot rolling step is subjected to cold rolling of a rolling reduction of at least 40% and at most 70% to be formed into a cold-rolled steel sheet; and (C) an annealing step in which the cold-rolled steel sheet obtained by the cold rolling step is subjected to a heat treatment in which the steel sheet is held in a temperature range of at least (Ac$_3$ point−30° C.) and at most (Ac$_3$ point+100° C.) for at least 10 seconds and at most 300 seconds, and then is cooled at an average cooling rate of at least 15° C./sec in a temperature range of at least 500° C. and at most 650° C., thereafter being held in a temperature range of at least 300° C. and at most 500° C. for at least 30 seconds and at most 3000 seconds.

The steel sheet relating to the present invention is suitable as a starting material of an impact absorbing portion in an impact absorbing member, the impact absorbing portion absorbing impact energy by being axially crashed and buckled, and especially suitable as a starting material for impact absorbing members of automobile. To be specific, the present steel sheet is, for example, preferably used as a starting material for a crash box of automobile, which has a tubular main body having a closed section, (and which is mounted onto a body shell such as a side member while supporting a bumper reinforcement, and is configured to be axially crashed and plastically deformed into a bellows shape by an impact load applied from the bumper reinforcement). The steel sheet can also be advantageously used as a starting material for a side member, a front upper rail, a side sill, and a cross member of automobile.

Manufacturing an impact absorbing member from a steel sheet involving to the present invention will make it possible to obtain an impact absorbing member which can suppress or eliminate the occurrence of cracking when subjected to an impact load, and which exhibits a high effective flow stress, thereby dramatically improving the absorption of impact energy of the impact absorbing member. Since applying such an impact absorbing member to a product such as an automobile will allow further improvement of the collision safety of the product, the present invention is highly beneficial industrially.

DESCRIPTION OF EMBODIMENTS

Figure 1:
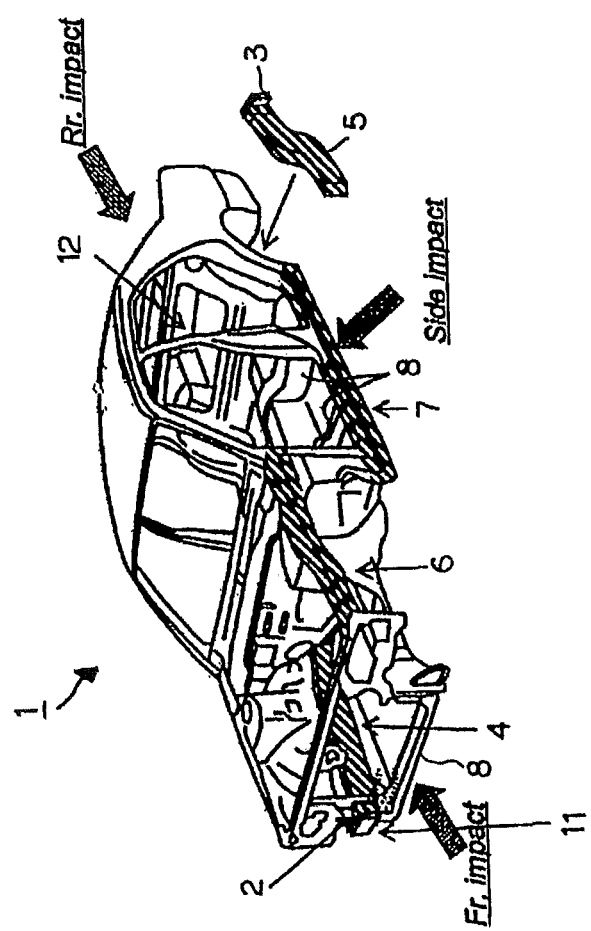
FIG. 1 is an explanatory diagram to show an example of regions where an impact absorbing member is applied.

Hereafter, the present invention will be described in more specifically. It is noted that in the following description, "%" relating to the chemical composition of steel all represents "mass %". The following description is for the purpose of exemplifying the present invention, and is not intended for limiting the present invention.

1. Chemical Composition (1) C: at least 0.08% and at most 0.30%

C (carbon) has the function of promoting the formation of bainite which is the main phase, and martensite and retained austenite which are contained in a second phase. C also has the function of improving the tensile strength of steel sheet as a result of increasing the strength of martensite. Further, C has the function of strengthening steel through solid solution strengthening, thereby improving the yield strength and tensile strength of steel sheet.

When C content is less than 0.08%, there may be cases where it is difficult to achieve effects of the above described functions. Therefore, C content is at least 0.08%. It is preferably more than 0.12%, and more preferably more than 0.14%. On the other hand, when C content exceeds 0.30%, there may be cases where martensite and austenite are excessively formed, thereby causing a significant decrease in the local ductility of steel sheet. Moreover, the weldability is significantly deteriorated. Therefore, C content is at most 0.30%. It is preferably less than 0.20%, and more preferably less than 0.19%.

(2) Mn: at least 1.5% and at most 3.5%

Mn (manganese) has the function of promoting the formation of bainite which is the main phase, and martensite and retained austenite which are contained in a second phase. Moreover, Mn has the function of strengthening steel through solid solution strengthening, thereby improving the yield strength and tensile strength of steel sheet. Further, since Mn improves the strength of bainite through solid solution strengthening, it has the function of improving the local ductility of steel sheet by improving the hardness of bainite under a high strain load condition.

When Mn content is less than 1.5%, there may be cases where it is difficult to achieve effects of the above described functions. Therefore, Mn content is at least 1.5%. It is preferably more than 1.8%, more preferably more than 2.0%, and further preferably more than 2.2%. On the other hand, when Mn content is more than 3.5%, the bainite transformation is excessively delayed, and as a result of that, the stabilization of retained austenite cannot be achieved, making it difficult to achieve a predetermined amount of retained austenite. Therefore, Mn content is at most 3.5%. It is preferably less than 3.1%, more preferably less than 2.8%, and further preferably less than 2.5%.

(3) Si+Al: at least 0.50% and at most 3.0%

Si and Al have the function of promoting the formation of retained austenite through the suppression of the formation of carbides in bainite, thereby improving the uniform ductility and the local ductility of steel sheet. Moreover they have the function of strengthening steel through solid solution strengthening, and thereby improving the yield strength and the tensile strength of steel sheet. Further, since the strength of bainite is improved by solid solution strengthening, they also have the function of improving the local ductility of steel sheet by improving the hardness of bainite under a high strain load condition.

When the total content of Si and Al (also referred to as "Si+Al" content) is less than 0.50%, it is difficult to achieve effects of the above described functions. Therefore, (Si+Al) content is at least 0.50%. It is preferably at least 1.0%, and more preferably at least 1.3%. On the other hand, even when (Si+Al) content is at least 3.0%, the effects of the above described functions reach a limit, which is disadvantageous in respect of cost. This also leads to increase in the temperature of transformation point, and thereby deteriorate the productivity. Therefore, (Si+Al) content is at most 3.0%. It is preferably at most 2.5%, more preferably less than 2.2%, and further preferably less than 2.0%.

Since Si has excellent solid solution strengthening capability, Si content is preferably at least 0.50%, and more preferably at least 1.0%. On the other hand, since Si has the function of reducing the chemical convertibility and weldability of steel sheet, Si content is preferably less than 1.9%, more preferably less than 1.7%, and further preferably less than 1.5%.

(4) P: at most 0.10%

P (phosphorus), which is generally contained as an impurity and segregates at grain boundaries, has the function of embrittling the steel, and promoting the occurrence of cracking when subjected to an impact load. When P content is more than 0.10%, the embrittlement of steel due to the above described function becomes significant, and it becomes difficult to suppress the occurrence of cracking when subjected to an impact load. Therefore, P content is at most 0.10%. It is preferably less than 0.020%, and more preferably less than 0.015%.

(5) S: at most 0.010%

S (sulfur), which is generally contained as an impurity, has the function of forming sulfide-based inclusions in steel and thereby deteriorating the formability thereof. When S content is more than 0.010%, the effects of the above described function becomes critical. Therefore, S content is at most 0.010%. It is preferably at most 0.005%, more preferably less than 0.003%, and further preferably at most 0.001%.

(6) N: at most 0.010%

N (nitrogen), which is generally contained in steel as an impurity, has the function of deteriorating the ductility of steel sheet. When N content is more than 0.010%, this ductility deterioration becomes significant. Therefore, N content is at most 0.010%. It is preferably at most 0.0060%, and more preferably at most 0.0050%.

Elements to be described below are optional elements which can be contained in steel as desired.

(7) One or more selected from Cr: at most 0.5%, Mo: at most 0.5%, and B: at most 0.01%

Cr, Mo, and B have the function of improving the hardenability, and promoting the formation of bainite. Moreover, they also have the function of promoting formation of martensite and retained austenite. They further have the function of strengthening steel through solid solution strengthening, thereby improving the yield strength and the tensile strength of steel sheet. Therefore, one or two selected from Cr, Mo, and B may be contained.

However, when Cr content exceeds 0.5%, Mo content exceeds 0.5%, or B content exceeds 0.01%, there may be a case where the uniform elongation and the local ductility of steel sheet are significantly deteriorated. Therefore, it is set such that Cr content is at most 0.5%, Mo content is at most 0.5%, and B content is at most 0.01%. To more surely achieve effects of the above described functions, it is preferable that any one of Cr: at least 0.1%, Mo: at least 0.1% and B: at least 0.0010% is satisfied.

(8) One or more selected from Ti: less than 0.04%, Nb: less than 0.030%, and V: less than 0.5%

Ti, Nb and V have the function of suppressing the grain growth of austenite being annealed such as by forming carbonitrides in steel, and thereby reducing cracking sensitivity. Moreover, they also have the function of precipitating into bainite and improving the yield strength of steel sheet by the effect of precipitation strengthening. Therefore, one or more of Ti, Nb, and V may be contained.

However, even when Ti content is at least 0.04%, Nb content is at least 0.030%, and V content is at least 0.5%, effects of the above described functions reach a limit, which is disadvantageous in respect to cost. Therefore, Ti content is less than 0.04%, Nb content is less than 0.030%, and V content is less than 0.5%. Ti content is preferably less than 0.020%. Nb content is preferably less than 0.020%, and more preferably at most 0.015%. V content is preferably at most 0.30%. To more surely achieve effects of the above described functions, it is preferable that any one of Ti: at least 0.01%, Nb: at least 0.005% and V: at least 0.010% is satisfied. When Nb is contained, Nb content is more preferably at least 0.010%.

(9) One or more selected from Ca: at most 0.010%, Mg: at most 0.010%, REM: at most 0.050%, and Bi: at most 0.050%

Ca, Mg, REM, and Bi all have the function of improving the local ductility of steel sheet: by controlling the shape of inclusions regarding Ca, Mb, and REM, and by making the solidification structure finer regarding Bi. Therefore, one or more of these elements may be contained.

However, regarding Ca and Mg, when contained more than 0.010%, and regarding REM, when contained more than 0.050%, a large number of coarse oxides are produced in steel, and deteriorate the formability of steel sheet. Regarding Bi, when contained more than 0.050%, it segregates at grain boundaries, deteriorating the weldability. Therefore, the content of each element is specified as described above. The contents of Ca, Mg, and REM are preferably at most 0.0020% for each, and the content of Bi is preferably at most 0.010%. To more surely achieve effects of the above described functions, it is preferable to satisfy any of the conditions: Ca: at least 0.0008%, Mg: at least 0.0008%, REM: at least 0.0008%, and Bi: 0.0010%.

Here, REM means 17 elements in total including Sc, Y, and lanthanoid, and regarding lanthanoid, industrially it is added in the form of misch metal. It is noted that in the present invention, the content of REM means a total content of these elements.

2. Microstructure (1) Multi-Phase Structure

The steel structure of the steel sheet according to the present invention is configured to have a multi-phase structure containing bainite as the main phase, and martensite and retained austenite in a second phase to improve the effective flow stress by obtaining high yield strength and the high work hardening coefficient in a low strain region. The remainder of the second phase is ferrite.

(2) Area Fraction of Bainite: More than 50%

In a multi-phase structure steel sheet having bainite as the main phase, the bainite area fraction affects the yield strength of the steel sheet. That is, the yield strength is improved by increasing the area fraction of bainite. When the area fraction of bainite is less than 50%, it becomes difficult to obtain an impact absorbing member having excellent impact absorbing capability due to deficiency of yield strength. Therefore, the area fraction of bainite is more than 50%.

(3) Martensite Area Fraction: at Least 3% and at Most 30%

In the multi-phase structure steel sheet having bainite as the main phase, martensite has the function of increasing 5% flow stress of steel sheet by improving the yield strength of steel sheet and the work hardening rate thereof in a low strain region. Moreover, it also has the function of improving the uniform elongation of steel sheet. When the martensite area fraction is less than 3%, it becomes difficult to obtain an impact absorbing member having excellent impact absorbing capability due to deficiencies of 5% flow stress and uniform elongation. Therefore, the martensite area fraction is at least 3%. It is preferably at least 5%. On the other hand, when the martensite area fraction is more than 30%, the local ductility of steel sheet decreases so that cracking due to unstable buckling becomes likely to occur. Therefore, the area fraction of martensite is at most 30%. The area fraction of martensite is preferably at most 25%, and more preferably at most 15%.

(4) Retained Austenite Area Fraction: at Least 3% and at Most 15%

In the multi-phase structure steel sheet having bainite as the main phase, retained austenite has the function of increasing 5% flow stress of steel sheet by increasing the yield strength thereof and the work hardening rate in a low strain region. Moreover, it also has the function of improving the uniform elongation of steel sheet. When the retained austenite area fraction is less than 3%, it becomes difficult to obtain an impact absorbing member having excellent impact absorbing capability due to deficiencies of 5% flow stress and uniform elongation. Therefore, the retained austenite area fraction is at least 3%. On the other hand, when the retained austenite area fraction is more than 15%, the local ductility of steel sheet decreases so that cracking due to unstable buckling becomes likely to occur. Therefore, the area fraction of retained austenite is at most 15%.

(5) Average Grain Diameter of Ferrite which is Remaining Structure: Less than 5 μm When the average grain diameter of ferrite which is the remaining structure is at least 5 μm, strain becomes likely to concentrate in soft ferrite and yield strength decreases so that it becomes difficult to increase 5% flow stress of steel sheet. Moreover, the local ductility of steel sheet decreases and it becomes difficult to suppress the occurrence of cracking when subjected to an impact load. Therefore, the average grain diameter of ferrite is at most 5 μm. It is preferably less than 4.0 μm, and more preferably less than 3.0 μm. There is no need to particularly specify the lower limit of the average grain diameter of ferrite.

Although there is no need to particularly specify the area fraction of ferrite, the lower limit thereof is preferably at least 1%, and more preferably at least 5%. On the other hand, the upper limit is preferably at most 20%, more preferably at most 15%, and further preferably at most 10%.

(6) Hardness Ratio of Bainite and Martensite: $1.2 \leq H_{M0}/H_{B0} \leq 1.6$

By configuring that the hardness ratio ($H_{M0}/H_{B0}$) of initial average nano hardness ($H_{M0}$) of martensite contained in the second phase and initial average nano hardness ($H_{B0}$) of bainite which is the main phase is at least 1.2, it becomes easy to achieve increases in the work hardening coefficient in a low strain range and the uniform elongation by including martensite, and occurrence of cracking is effectively suppressed. Therefore, the above described hardness ratio ($H_{M0}/H_{B0}$) is preferably at least 1.2.

On the other hand, since the hardness ratio between the bainite main phase and the hard second phase is appropriately suppressed by keeping the above described hardness ratio ($H_{M0}/H_{B0}$) to be at most 1.6, it becomes easy to achieve improve in the yield strength of steel sheet because formation of mobile dislocation is suppressed by plastic deformation. Thereby it becomes easy to improve the absorption of impact energy and to obtain an impact absorbing member having excellent impact absorbing capability. Therefore, the above described hardness ratio ($H_{M0}/H_{B0}$) is preferably at most 1.6.

(7) Work Hardening Rate Ratio of Martensite with Respect to Bainite: $0.9 \leq \{(H_{M10}/H_{M0})/(H_{B10}/H_{B0})\} \leq 1.3$ In the multi-phase structure steel sheet having bainite as the main phase, suppressing the concentration of strain and work hardening in bainite due to plastic deformation will suppress the occurrence of cracking along a shear band and a grain boundary in bainite, making it easy to improve the local ductility of steel sheet. On the other hand, suppressing excessive hardening of the second phase due to plastic deformation will suppress increase in the hardness difference between the main phase and the second phase, and thus suppress the occurrence of cracking from an interface between them, making it easy to improve the local ductility of steel sheet. Therefore, to achieve higher local ductility in a multi-phase structure steel sheet having bainite as the main phase, it is preferable to cause strain to be appropriately distributed between bainite which is the main phase and the second phase. That is, it is preferable that bainite which is the main phase and the second phase are subjected to a same level of work hardening when plastically deformed. As an index for this, it is preferable to use a ratio of work hardening rates after 10% tensile deformation. In a multi-phase structure steel sheet containing bainite as the main phase and martensite in a second phase, it is preferable to set a lower limit and an upper limit for the ratio of the work hardening rate of martensite after 10% tensile deformation, which is the hardest phase with respect to the work hardening rate of bainite after 10% tensile deformation.

To be specific, it is preferable to set an upper and lower limits for a work hardening rate ratio $\{(H_{M10}/H_{M0})/(H_{B10}/H_{B0})\}$ which is the ratio of a work hardening rate of martensite ($H_{M10}/H_{M0}$) determined from an initial average nano hardness ($H_{M0}$) of martensite and an average nano hardness ($H_{M10}$) of martensite after 10% tensile deformation, and a work hardening rate ratio of bainite ($H_{B10}/H_{B0}$) determined from an initial average nano hardness ($H_{B0}$) of bainite and an average nano hardness ($H_{B10}$) of bainite after 10% tensile deformation.

When the above described work hardening rate ratio is at least 0.9, the concentration of strain and work hardening in bainite due to plastic deformation is suppressed, and thereby the occurrence of cracking along a shear band and a grain boundary in bainite is suppressed, thus improving the local ductility of steel sheet. Therefore, the above described work hardening rate ratio is preferably at least 0.9. On the other hand, when the above described work hardening rate ratio is at most 1.3, excessive hardening of martensite is suppressed and the local ductility of steel sheet is improved as well. Therefore, the above described work hardening rate ratio is preferably at most 1.3.

3. Mechanical Properties

The mechanical properties of the steel sheet according to the present invention are such that the product of uniform elongation and hole expansion ratio is at least 300%$^2$, and an effective flow stress when 5% true strain is applied (hereafter, also referred to as 5% effective flow stress) is at least 900 MPa.

As described above, to improve the absorption of impact energy of an impact absorbing member, it is effective to increase the 5% flow stress of the steel sheet of the starting material; and to suppress the occurrence of cracking when subjected to an impact load, it is effective to improve the uniform elongation and the local ductility of steel sheet. To respond to severe needs in recent years, as an index to achieve these, it is necessary that the product of uniform elongation and hole expansion ratio is at least 300%$^2$, and the 5% effective flow stress is at least 900 MPa. Therefore, the steel sheet has such mechanical properties. The product of uniform elongation and hole expansion ratio is preferably at least 400%$^2$, and the 5% effective flow stress is preferably at least 930 MPa.

As the other mechanical properties of the steel sheet according to the present invention, it is preferable that YS is at least 600 MPa, and TS is at least 900 MPa.

4. Applications

The above described steel sheets are preferably applied to an impact absorbing portion in an impact absorbing member, which the impact absorbing portion absorbs impact energy by being axially crashed and buckled.

Employing the steel sheet according to the present invention as the impact absorbing portion can suppress or eliminate the occurrence of cracking of an impact absorbing member when subjected to an impact load. At the same time, since the effective flow stress is high, it becomes possible to dramatically improve the absorption of impact energy of the above described impact absorbing member. This will be verified by exhibiting a highly stable buckling ratio (proportion of test samples free from cracking) for a proper average crash load in a crash test of an impact absorbing member.

FIG. 1 is an explanatory diagram to show an example of portions to which an impact absorbing member is applied in an automobile. An impact absorbing member having an impact absorbing portion, which absorbs impact energy by being axially crashed and buckled, can include automobile members such as those members as shown by shadowing in FIG. 1 (front and rear crash boxes 2, 3, front and rear side members 4, 5, front upper rail 6, side sill 7, and the like) and members such as cross members 8. Further, it also can include a bumper reinforcement 11 and a center pillar 12. In FIG. 1, "Fr. Impact" means frontal collision, and "Rr. Impact" means rear collision.

Figure 2:
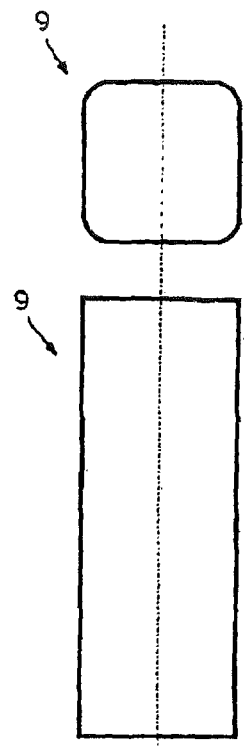
FIG. 2 is a two-view diagram to show an example of the shape of an impact absorbing portion.
Figure 3:
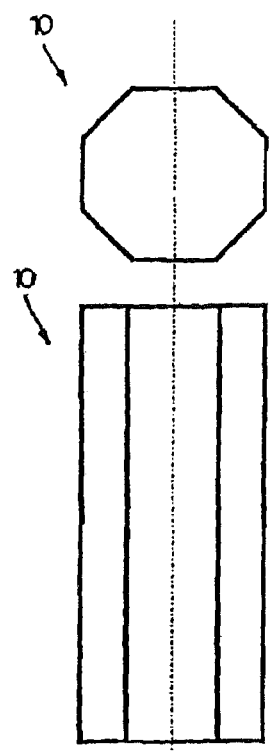
FIG. 3 is a two-view diagram to show an example of the shape of an impact absorbing portion.

FIGS. 2 and 3 are both two-view diagrams to show an example of the shape of an impact absorbing portion.

The shape of the above described impact absorbing portion, for which a tubular body having a closed section is suitable, can be exemplified by tubular bodies having a closed section of a rectangular shape as shown in FIG. 2 and a closed section of an octagonal shape as shown in FIG. 3. It is noted that although an example in which the sectional shape is constant in the axial direction is shown in each of FIGS. 2 and 3, the sectional shape may be, without being limited to those, a continuously changing in the axial direction. Moreover, although examples whose sectional shapes are a rectangular shape and an octagonal shape are shown in FIGS. 2 and 3, the sectional shape may be, without being limited to those, any polygonal shape.

In general, such an impact absorbing member of automobile is manufactured by foaming a tubular body having a closed section from steel sheet, for example, by bending and welding, and further subjecting the obtained tubular body to 2-dimensional or 3-dimensional bending, as needed.

5. Plating Layer

The above described steel sheet may be a surface-treated steel sheet having a plating layer on the surface thereof for the purpose of improving corrosion resistance, and so on. The plating layer may be an electroplating layer or a hot-dip plating layer. The electroplating layer may be formed, for example, by electro-galvanizing, Zn—Ni alloy electroplating, and the like. The hot-dip plating layer may be formed, for example, by hot-dip galvanizing, alloyed hot-dip galvanizing, hot-dip Al plating, hot-dip Zn—Al alloy plating, hot-dip Zn—Al—Mg alloy plating, hot-dip Zn—Al—Mg—Si alloy plating, and the like. The mass of deposit of plating is not particularly limited, and may be the same as prior art. Moreover, appropriate chemical treatment (for example, coating with silicate-base chromium-free chemical conversion treatment and drying) can be applied after plating to further improve corrosion resistance.

6. Manufacturing Method

The steel sheet having the above described chemical composition, microstructure, and mechanical properties can be manufactured by a method including the following steps (A) to (C):

(A) a hot rolling step in which a slab having the above described chemical composition is subjected to multi-pass hot rolling in which rolling is completed at a temperature of at least $Ar_3$ point, the obtained steel sheet is cooled to a temperature range of at least 620° C. and at most 720° C. under a cooling condition in which cooling is started within 0.4 seconds after completion of rolling, and an average cooling rate is at least 600° C./sec, as well as a time required for cooling from completion of rolling in a rolling pass which is two passes before the last rolling pass to 720° C. is at most 4 seconds, and the steel sheet is held in the temperature range for at least 1 second and at most 10 seconds, thereafter being cooled to a temperature range of at least 300° C. and at most 610° C. at an average cooling rate of at least 10° C./sec and at most 100° C./sec, and being coiled to obtain a hot-rolled steel sheet;

(B) a cold rolling step in which the hot-rolled steel sheet obtained by the hot rolling step is subjected to cold rolling of a rolling reduction of at least 40% and at most 70% to be formed into a cold-rolled steel sheet; and (C) an annealing step in which the cold-rolled steel sheet obtained by the cold rolling step is subjected to a heat treatment in which the steel sheet is held in a temperature range of at least ($Ac_3$ point−30° C.) and at most ($Ac_3$ point+100° C.) for at least 10 seconds and at most 300 seconds, and then is cooled at an average cooling rate of at least 15° C./sec in a temperature range of at least 500° C. and at most 650° C., thereafter being held in a temperature range of at least 300° C. and at most 500° C. for at least 30 seconds and at most 3000 seconds.

The above described microstructure can be easily obtained by applying the above described production conditions. Although the reason thereof is not necessarily clear, it is qualitatively contemplated as follows.

That is, by applying the above described hot rolling conditions, a microstructure in which ferrite and another hard phase are finely and uniformly dispersed is formed. By subjecting this microstructure to the above described cold rolling, the structure is made further uniform, and recrystallization is promoted in the succeeding annealing step. Consequently, the refinement and uniformization of the structure after annealing are achieved at a high level. Particularly, by applying the above described annealing condition, the grain growth of ferrite is significantly suppressed. This is because ferrite is finely and uniformly dispersed before annealing, and as a result, another hard phase which is finely and uniformly dispersed functions as a preferential nucleation site in austenite transformation and suppresses the grain growth of ferrite. Further, as a result of the another hard phase which is finely and uniformly dispersed functioning as a preferential nucleation site for austenite transformation, the austenite after transformation is finely and uniformly dispersed from beginning. Moreover, the grain growth of austenite after transformation is significantly suppressed by the above described finely dispersed ferrite. It is contemplated that since those synergistic effects make it possible to obtain a fine and uniform structure, the above described microstructure can be achieved.

(A) Hot Rolling Step

A slab having the above described chemical composition is subjected to multi-pass hot rolling in which rolling is completed at a temperature of at least $Ar_3$ point, the obtained steel sheet is cooled to a temperature range of at least 620° C. and at most 720° C. under a cooling condition in which cooling is started within 0.4 seconds after completion of rolling, and an average cooling rate is at least 600° C./sec, as well as a time required for cooling from completion of rolling in a rolling pass which is two passes before the last rolling pass to 720° C. is at most 4 seconds, and the steel sheet is held in the temperature range for at least 1 second and at most 10 seconds, thereafter being cooled to a temperature range of at least 300° C. and at most 610° C. at an average cooling rate of at least 10° C./sec and at most 100° C./sec, and being coiled to obtain a hot-rolled steel sheet.

To obtain the above described microstructure after applying the cold rolling and annealing to be described below, it is essential to control the microstructure of the hot-rolled steel sheet which will be the starting material thereof, as described above.

A multi-pass rolling is used for the rolling. The rolling reduction per one pass is preferably at least 15% and at most 60%. Since the larger rolling reduction per one pass introduces the larger strain into austenite, the grain of the ferrite to be formed in the subsequent transformation is made finer, and thereby the structure of the hot-rolled steel sheet is made finer. For this reason, the rolling reduction per one pass is preferably at least 20% for the three passes from the rolling pass, which is two passes before the last rolling pass, to the last rolling pass. The rolling reduction is more preferably at least 22%, and particularly preferably at least 30%. On the other hand, from the perspective of surely controlling rolling load and sheet shape, the rolling reduction per one pass is preferably less than 50%. When it is desired that particularly the controlling of sheet shape is made easy, the rolling reduction per one pass is preferably at most 45%.

To make the microstructure of hot-rolled steel sheet fine and uniform, it is necessary to select the temperature at rolling completion such that transformation from austenite to ferrite occurs after completion of rolling. For the purpose, the temperature at rolling completion is at least $Ar_3$ point. From the perspective of avoiding increase of rolling load, this temperature is preferably at least 780° C. From the perspective of the refining the structure of hot-rolled steel sheet, rolling completion temperature is preferably as low as possible within a temperature range of at least $Ar_3$ point or at least 780° C. This is because lower rolling completion temperatures allow work strain which is introduced into austenite by rolling to be accumulated more efficiently, thereby promoting refinement of the microstructure of hot-rolled steel sheet. On the other hand, from the perspective of uniformizing the structure of hot-rolled steel sheet, the rolling completion temperature is preferably at least 850° C. It is more preferably at least 900° C. This is because appropriately increasing the rolling completion temperature allows ferrite as well as the other hard phase to be uniformly dispersed, thereby further improving the formability of steel sheet after cold rolling and annealing. It is noted that from the perspective of suppressing the release of work strain which is introduced into austenite by rolling, thereby efficiently promoting the refinement of the microstructure of hot-rolled steel sheet, the rolling completion temperature is preferably at most 980° C. It is more preferably at most 930° C.

Cooling after the completion of rolling is performed such that release of work strain which is introduced into austenite by rolling is suppressed during cooling, and after cooling, austenite is made to transform into ferrite at once with the work strain as driving force, thereby producing a structure having fine ferrite grains. For that reason, the steel sheet is cooled to a temperature range of at least 620° C. and at most 720° C. under a cooling condition in which cooling is started within 0.4 seconds after completion of rolling, and an average cooling rate is at least 600° C./sec, as well as a time required for cooling from completion of rolling in a rolling pass which is two passes before the last rolling pass to 720° C. is at most 4 seconds. The time required for cooling from completion of rolling in a rolling pass which is two passes before the last rolling pass to 720° C. is preferably at most 3.5 seconds. The average cooling rate at that time is preferably at least 900° C./sec, and more preferably more than 1000° C./sec. This cooling is referred to as primary cooling in Examples.

Such rapid cooling immediately after hot rolling can be carried out by a water cooling apparatus which is disposed right after the last rolling stand and can inject a large flow of cooling water with high pressure toward the steel sheet immediately after rolling.

The temperature range of at least 620° C. and at most 720° C. is a temperature range in which ferrite transformation is activated. By cooling the steel sheet with the work strain, which is introduced into austenite, being suppressed from being released by applying the above described cooling condition and holding the steel sheet in this temperature range, it is possible to cause ferrite transformation at once with the work strain of austenite as driving force. As a result of that, since ferrite precipitates not only at austenite grain boundaries but also within grains so that the nucleation of ferrite transformation occurs at a high density, it is possible to form a structure in which fine ferrite grains are uniformly dispersed. For that reason, the steel sheet which has been cooled to a temperature range of at least 620° C. and at most 720° C. under the above described condition is held in this temperature range for at least 1 second. On the other hand, when the holding time in the above described temperature range is more than 10 seconds, the grain growth of ferrite may be promoted. Therefore, the holding time in the above described temperature range is at most 10 seconds. Since this temperature holding is performed for a short holding time, it also can be achieved by adopting air cooling for the cooling. That is, it does not matter if the temperature of steel sheet gradually decreases as long as it can be held in the above described temperature range for at least 1 second.

Following the above described temperature holding, the steel sheet is cooled to a temperature range of at least 300° C. and at most 610° C. at an average cooling rate of at least 10° C./sec and at most 100° C./sec, and is coiled. This cooling is referred to as secondary cooling in Examples. By performing such cooling and coiling following the above described rolling, cooling and temperature holding, it is possible to obtain a microstructure of hot-rolled steel sheet having fine pro-eutectoid ferrite and bainite or bainitic ferrite, which are finely and uniformly dispersed. As a result of this, it becomes possible to achieve the above described microstructure after cold rolling and annealing.

When the above described average cooling rate is less than 10° C./sec, coarse pearlite may precipitate along segregation to produce a banded structure, and to cause coarsening of iron carbides. When the banded structure is produced, a region in which coarsening of ferrite is likely to proceed in the annealing step after cold rolling takes place, and it becomes impossible to achieve the refinement of ferrite and the uniformization of structure after annealing. When iron oxide is coarsened, it becomes difficult to suppress the growth of ferrite grain in the annealing step after cold rolling, and thus it becomes impossible to achieve refinement of ferrite. Therefore, the above described average cooling rate is at least 10° C./sec. It is preferably at least 15° C./sec, and more preferably at least 20° C./sec. On the other hand, when the above described average cooling rate is more than 100° C./sec, the flatness of steel sheet may be deteriorated. Therefore, the above described average cooling rate is at most 100° C./sec. It is preferably at most 80° C./sec.

When the coiling temperature is less than 300° C., the hardening of hot-rolled steel sheet becomes significant, deteriorating its cold rollability. Therefore, the coiling temperature is at least 300° C. It is preferably at least 350° C. On the other hand, when the coiling temperature is more than 610° C., the problem similar to the one when the average cooling rate is less than 10° C./sec occurs. Therefore, the coiling temperature is at most 610° C. It is preferably at most 500° C.

A slab to be subjected to hot rolling is made by melting steel having the above described chemical composition, and thereafter forming it into a slab by continuous casting or casting and billeting. From the perspective of productivity, continuous casting is preferably used. Moreover, when continuous casting is used, it is preferable to perform the fluidization of molten steel by external magnetic field or mechanical stirring in the mold to improve cracking resistance by control of inclusions. Thus obtained slab may be subjected directly to hot rolling, or subjected to hot rolling after performing heat holding or reheating.

The temperature of the slab at which the slab is subjected to hot rolling is preferably less than 1280° C. to prevent coarsening of austenite. It is more preferably at most 1250° C., and particularly preferably at most 1200° C. There is no need of setting a lower limit for the temperature of the slab at which the slab is subjected to hot rolling, it will suffice if rolling can be completed at a temperature at least $Ar_3$ point as described above.

Hot rolling typically consists of rough hot rolling and finish hot rolling, in which the above described slab is formed into a rough bar by the rough hot rolling, and the obtained rough bar is generally formed into a hot-rolled steel sheet by the finish hot rolling. In this case, it is preferable to reheat the rough bar obtained by the rough hot rolling to 1000° C. or higher before subjecting it to the finish hot rolling. It is more preferable to reheat it to 1050° C. or higher.

The heating of rough bar can be performed, for example, by installing a heating apparatus in front of stands of finish hot rolling, and through induction heating or energization heating, or heating by use of a gas heater or an infrared heater as the heat source. Performing such heating of rough bar makes it possible to effectively remove secondary scale by subsequently subjecting it to descaling with high pressure water, and to suppress fluctuation of cooling caused by scale and occurrence of surface flaws. The reheating temperature of the above described slab is preferably at least 1050° C.

(B) Cold Rolling Step

The hot-rolled steel sheet obtained by the above described hot rolling step is subjected to cold rolling of a rolling reduction of at least 40% and at most 70% to be formed into a cold-rolled steel sheet.

The hot-rolled steel sheet is subjected to cold rolling after being descaled by acid pickling etc. according to a common procedure. To promote recrystallization in the subsequent annealing step and to refine and uniformize the microstructure after annealing by cold rolling, the rolling reduction of cold rolling is at least 40%. On the other hand, when the rolling reduction is too high, rolling load increases making the rolling difficult, and therefore the rolling reduction of cold rolling is at most 70%. It is preferably less than 60%. The steel sheet after cold rolling is degreased as needed to be subjected to annealing.

(C) Annealing Step

Annealing is performed by subjecting the cold-rolled steel sheet obtained by the above described cold rolling step to a heat treatment in which the steel sheet is held in a temperature range of at least ($Ac_3$ point−30° C.) and at most ($Ac_3$ point+100° C.) for at least 10 seconds and at most 300 seconds, and then is cooled at an average cooling rate of at least 15° C./sec in a temperature range of at least 500° C. and at most 650° C., thereafter being held in a temperature range of at least 300° C. and at most 500° C. for at least 30 seconds and at most 3000 seconds.

By subjecting the above described cold-rolled steel sheet to annealing under the above described conditions, it is possible to obtain a desired microstructure.

In the annealing, the cold-rolled steel sheet is first held in a temperature range of at least ($Ac_3$ point−30° C.) and at most ($Ac_3$ point+100° C.) for at least 10 seconds and at most 300 seconds. In Examples, this temperature holding is referred to as soaking. When this holding temperature (soaking temperature in Examples) is less than ($Ac_3$ point−30° C.), there may be a case in which the degree of austenization becomes insufficient and an desired microstructure cannot be achieved after annealing. Therefore, the holding temperature is at least ($Ac_3$ point−30° C.). It is preferably more than ($Ac_3$ point−20° C.), more preferably more than ($Ac_3$ point−10° C.), and particularly preferably more than ($Ac_3$ point+20° C.).

Heating to a temperature range of at least ($Ac_3$ point−30° C.) and at most ($Ac_3$ point+100° C.) is preferably performed at a heating rate of less than 20° C./s in the temperature range of at least 500° C. from the perspective of the stability of the control of structure.

When the holding time (soaking time in Examples) in the above described temperature range is less than 10 seconds, there may be a case in which uniform control of structure becomes difficult and a desired microstructure cannot be achieved. Therefore, the holding time is at least 10 seconds. It is preferably at least 60 seconds.

On the other hand, when the above described holding temperature is more than ($Ac_3$ point+100° C.), or the above described holding time is more than 300 seconds, there may be a case in which suppressing the grain growth of austenite becomes difficult even if the above described hot rolling step and the cold rolling step are applied, and a desired microstructure cannot be achieved after annealing. Therefore, the above described holding temperature is at most ($Ac_3$ point+100° C.), and the above described holding time is at most 300 seconds. The above described holding temperature is preferably at most ($Ac_3$ point+50° C.), and more preferably at most ($Ac_3$ point+30° C.). Moreover, it is preferably at most 950° C. The above described holding time is preferably less than 200 seconds.

When it is strived for improving ductility by increasing the volume fraction of ferrite, it is preferable that the temperature is held in a temperature range of at least ($Ac_3$ point−30° C.) and at most ($Ac_3$ point+100° C.) for at least 10 seconds and at most 300 seconds, and thereafter is cooled by at least 50° C. at a cooling rate of less than 10° C./s. This cooling is referred to as slow cooling in Examples. The cooling rate in this case is preferably less than 5.0° C./s, more preferably less than 3.0° C./s, and particularly preferably less than 2.0° C./s. To further increase the ferrite volume fraction, cooling temperature in this case is preferably at least 80° C., and more preferably at least 100° C. On the other hand, to obtain a desired structure, since it is preferable to suppress the ferrite volume fraction to some extent, the cooling temperature is preferably at most 200° C. It is more preferably at most 160° C.

Next, an desired microstructure is precisely created by cooling the temperature in a temperature range of at least 500° C. and at most 650° C. at an average cooling rate of at least 15° C./s, and holding it in a temperature range of at least 300° C. and at most 500° C. for at least 30 seconds and at most 3000 seconds. When the above described average cooling rate is less than 15° C./s, there may be a case in which ferrite is excessively produced, and a desired structure cannot be obtained after annealing. Therefore, the above described average cooling rate is at least 15° C./s. It is preferably at least 30° C./s, and more preferably at least 40° C./s. From the perspective of the control of structure, there is no need to specify an upper limit of the above described average cooling rate. However, when the above described average cooling rate is excessively high, there may be a case in which cooling irregularity takes place and the sheet shape is deteriorated. Therefore, the above described average cooling rate is preferably at most 150° C./s. It is more preferably less than 130° C./s.

This cooling is referred to as rapid cooling in Examples. It is all right if the cooling in the temperature range of at least 500° C. and at most 650° C. is this rapid cooling. Therefore, the starting temperature of rapid cooling may be at least 650° C., and the stopping temperature of rapid cooling may be at most 500° C. and at least 300° C.

The reason why the temperature is held in a temperature range of at least 300° C. and at most 500° C. for at least 30 seconds is for producing a predetermined amount of retained austenite, and when the holding temperature in this case is more than 500° C., it becomes difficult to obtain a desired structure. The above described temperature range is preferably a temperature range of at least 330° C. and at most 450° C., and more preferably a temperature range of at least 350° C. and at most 430° C. Moreover, the holding time in the above described temperature range is preferably at least 200 seconds. An upper limit for the holding time in the above described temperature range is at most 3000 seconds from the perspective of productivity.

The cooling to the room temperature after the temperature is held in a temperature range of at least 300° C. and at most 500° C. for at least 30 seconds and at most 3000 seconds is preferably performed such that the temperature is cooled at a cooling rate of at least 2° C./s and less than 30° C./s through a temperature range of at least 170° C. and at most 300° C. to improve the balance between high impact absorbing property and cracking resistance. This cooling rate is preferably at least 5° C./s and at most 20° C./s.

When a plated steel sheet is produced, electroplating or hot-dip plating may be performed according to a common procedure on the cold-rolled steel sheet, which is produced by the above described method, and the plating method, chemical composition of plated coating, and with and without alloy treating after plating are non-limiting. In the case of hot-dip plating, the steel sheet may be subjected to hot-dip plating in a production line thereof, subsequently after it is held in a temperature range of at least 300° C. and at most 500° C. for at least 30 seconds and at most 3000 seconds in the annealing step by the above described heat treatment. The example of type of plating is as described above.

Thus obtained cold-rolled steel sheet and plated steel sheet may be subjected to temper rolling according to a common procedure. The elongation ratio of temper rolling is preferably at most 1.0% from the perspective of securing excellent ductility. It is more preferably at most 0.5%.

EXAMPLES

Experiments were carried out by using slabs (thickness: 30 mm, width: 160 to 250 mm, and length: 70 to 90 mm) having chemical compositions shown in Table 1. Each of the slabs was obtained by vacuum melting and casting 180 kg of molten steel, thereafter heating the obtained cast sample at an in-furnace temperature of 1250° C., and hot forging the same at a temperature of at least 950° C.

Each slab was subjected to reheating at 1200° C. for within 1 hour, thereafter to rough hot rolling of four passes, and further to finish hot rolling of three passes to obtain a hot-rolled steel sheet having a sheet thickness of 3 mm by using a hot rolling testing machine. The hot rolling conditions are shown in Table 2. In Table 2, the primary cooling means cooling immediately after the completion of hot rolling, the air cooling means slow cooling performed after the completion of the primary cooling, and the secondary cooling means cooling to a coiling temperature after the air cooling, respectively. Each of the primary cooling and the secondary cooling was water cooling.

The obtained hot-rolled steel sheet was subjected to cold rolling to a sheet thickness of 1.6 mm (rolling reduction: 47%), and thereafter to heat treatment for annealing under the conditions shown in Table 3 by using a continuous annealing simulator. In Table 3, soaking temperature means a heating temperature for annealing, the soaking time means a holding time at the heating temperature, the slow cooling rate means a cooling rate during gradual cooling performed after soaking, the rapid cooling means cooling after the slow cooling, and the holding time means a holding time at a stopping temperature of rapid cooling, respectively. The slow cooling was performed by air cooling, and the rapid cooling was performed by water cooling. The holding after the stop of rapid cooling was performed by an infrared heater associated with an apparatus.

In each of the following Tables, underlined numerals or symbols indicate that they are out of the range specified in the present invention.

TABLE 1

| Steel Type | Chemical compositions (Values without units are in mass %, and the remainder are Fe and impurities) | | | | | | | | | | $Ac_3$ point (° C.) | $Ar_3$ point (° C.) | Category |
|---|---|---|---|---|---|---|---|---|---|---|---|---|---|
| | C | Si | Mn | Cr | P | S | Al | N | Others | Si + Al | | | |
| A | 0.15 | 1.3 | 2.2 | 0.25 | 0.008 | 0.001 | 0.03 | 0.0032 | Ti: 0.01, Ca: 9 ppm, Mg: 9 ppm | 1.33 | 860 | 756 | Invent. |
| B | 0.15 | 1.3 | 2.2 | 0.25 | 0.012 | 0.001 | 0.03 | 0.0035 | Ti: 0.01, Mo: 0.2 | 1.33 | 865 | 757 | Invent. |
| C | 0.18 | 1.25 | 2.0 | 0.25 | 0.01 | 0.001 | 0.05 | 0.0033 | Nb: 0.010 | 1.3 | 870 | 765 | Invent. |
| D | 0.18 | 1.5 | 2.48 | — | 0.008 | 0.001 | 0.5 | 0.0031 | Nb: 0.005, REM: 6 ppm | 2 | 924 | 775 | Invent. |
| E | 0.16 | 1.3 | 2.49 | — | 0.008 | 0.001 | 0.046 | 0.0032 | Nb: 0.012 | 1.346 | 849 | 757 | Invent. |
| F | 0.149 | 0.53 | 2.04 | 0.25 | 0.002 | 0.0023 | 0.033 | 0.0035 | Ti: 0.01, V: 0.02, Ca: 20 ppm | 0.563 | 809 | 742 | Invent. |
| G | 0.15 | 1.25 | 2.5 | — | 0.01 | 0.001 | 0.15 | 0.003 | | 1.4 | 861 | 751 | Invent. |
| H | 0.025 | 1.01 | 2.46 | 0.26 | 0.003 | 0.002 | 0.2 | 0.0027 | | 1.21 | 914 | 775 | Compar. |
| I | 0.14 | 0.1 | 1.99 | 0.2 | 0.001 | 0.0029 | 0.028 | 0.0031 | | 0.128 | 825 | 750 | Compar. |
| J | 0.10 | 1.0 | 2.2 | 0.15 | 0.001 | 0.001 | 0.033 | 0.0042 | Mo: 0.12, B: 8 ppm, Bi: 0.009 | 1.033 | 839 | 750 | Invent. |

TABLE 2

| Hot Rolling Test Number | Steel Type | Slab Heating Temperature (° C.) | Last-Pass Rolling Reduction (%) | Rolling Completion Temperature (° C.) | Rolling Completion to Primary Cooling Starting Time (sec) | Primary Cooling Rate (° C./sec) | T[1]) (sec) | Cooling Completion Temperature (° C.) | Air Cooling Time (sec) | Secondary Cooling Rate (° C./sec) | Coiling Temperature (° C.) | Category |
|---|---|---|---|---|---|---|---|---|---|---|---|---|
| 1 | A | 1250 | 20 | 900 | 2 | 100 | 4.8 | 660 | 6.5 | 20 | 600 | Compar. |
| 2 | A | 1250 | 42 | 900 | 0.05 | >1000 | 3.0 | 660 | 6.5 | 75 | 500 | Invent. |
| 3 | B | 1250 | 42 | 900 | 0.05 | >1000 | 3.0 | 660 | 6.0 | 70 | 400 | Invent. |
| 4 | C | 1200 | 22 | 830 | 0.03 | >1000 | 1.5 | 710 | 7.0 | 70 | 600 | Invent. |
| 5 | D | 1250 | 30 | 900 | 0.04 | >1000 | 1.6 | 640 | 5.5 | 30 | 600 | Invent. |

TABLE 2-continued

| Hot Rolling Test Number | Steel Type | Slab Heating Temperature (° C.) | Last-Pass Rolling Reduction (%) | Rolling Completion Temperature (° C.) | Rolling Completion to Primary Cooling Starting Time (sec) | Primary Cooling Rate (° C./sec) | T[1] (sec) | Cooling Completion Temperature (° C.) | Air Cooling Time (sec) | Secondary Cooling Rate (° C./sec) | Coiling Temperature (° C.) | Category |
|---|---|---|---|---|---|---|---|---|---|---|---|---|
| 6 | D | 1250 | 33 | 900 | 0.04 | >1000 | 1.6 | 650 | 6.0 | 70 | 500 | Invent. |
| 7 | E | 1250 | 42 | 890 | 0.05 | >1000 | 3.0 | 670 | 7.0 | 70 | 500 | Invent. |
| 8 | F | 1250 | 33 | 910 | 0.05 | >1000 | 3.0 | 660 | 6.5 | 70 | 500 | Invent. |
| 9 | G | 1250 | 40 | 880 | 0.05 | >1000 | 2.8 | 660 | 7.0 | 70 | 500 | Invent. |
| 10 | H | 1200 | 18 | 830 | 0.035 | 100 | 2.3 | 670 | 7.8 | 35 | RT | Compar. |
| 11 | I | 1250 | 30 | 780 | 0.03 | >1000 | 1.4 | 750 | 5.0 | 60 | RT | Compar. |
| 12 | J | 1250 | 42 | 900 | 0.02 | >1000 | 1.6 | 670 | 6.5 | 70 | 500 | Invent. |

[1] Time required for cooling from completion of rolling in a rolling pass which is two passes before the last rolling pass to 720° C.

TABLE 3

| Cold Rolling Test Number | Hot Rolling Test Number | Steel Type | Soaking Temperature (° C.) | Soaking Time (sec) | Slow Cooling Rate (° C./sec) | Rapid Cooling Starting Temperature (° C.) | Rapid Cooling Rate (° C./sec) | Rapid Cooling Stopping Temperature (° C.) | Holding Time (sec) | Category |
|---|---|---|---|---|---|---|---|---|---|---|
| 1 | 1 | A | 850 | 95 | 2 | 680 | 50 | 350 | 300 | Compar. |
| 2 | 2 | A | 850 | 100 | 5 | 780 | 50 | 400 | 300 | Invent. |
| 3 | 2 | A | 760 | 120 | 2 | 680 | 50 | 530 | 3000 | Compar. |
| 4 | 3 | B | 850 | 90 | 2 | 700 | 50 | 400 | 300 | Invent. |
| 5 | 4 | C | 880 | 90 | 2 | 790 | 40 | 375 | 330 | Invent. |
| 6 | 5 | D | 950 | 90 | 2 | 700 | 50 | 400 | 300 | Invent. |
| 7 | 6 | D | 850 | 90 | 2 | 700 | 50 | 400 | 20 | Compar. |
| 8 | 7 | E | 860 | 100 | 2 | 780 | 40 | 400 | 330 | Invent. |
| 9 | 8 | F | 850 | 100 | 2 | 790 | 50 | 400 | 300 | Invent. |
| 10 | 9 | G | 850 | 90 | 2 | 740 | 40 | 350 | 300 | Invent. |
| 11 | 10 | H | 780 | 90 | 5 | 680 | 50 | 350 | 200 | Compar. |
| 12 | 11 | I | 780 | 120 | 2 | 700 | 50 | 400 | 330 | Compar. |
| 13 | 12 | J | 850 | 90 | 2 | 700 | 50 | 400 | 300 | Invent. |

Each cold-rolled steel sheet thus obtained was subjected to the following investigations.

Tension Test

Tension test was carried out by sampling a JIS 5 tensile test sample to determine yield strength (YS: 0.2% proof stress), tensile strength (TS), uniform elongation (u-El). Moreover, in this tension test, a true stress-true strain curve was sampled to determine 5% effective flow stress (5% flow stress in Table 5) from the flow stress at 5% true strain.

Hole Expanding Test

Hole expanding test was carried out according to Japan Iron and Steel Federation Standard JFS T 1001-1996 to determine hole expansion ratios (HER).

Martensite Area Fraction

A section of steel sheet in parallel with the rolling direction thereof was mirror polished, and thereafter strain was removed by electrolytic grinding so that EBSD analysis was carried out at a depth of ¼ sheet thickness to determine the area fraction of martensite from a grain boundary face orientation difference map and an image quality map. Since martensite has relatively high internal dislocation density, and thereby exhibits obviously lower values than other portions in the image quality of EBSD, its separation and determination are easy.

Retained Austenite Area Fraction

The portion at a depth of ¼ sheet thickness of a section of steel sheet in parallel with the rolling direction was exposed by mechanical grinding and chemical polishing of 100 μm, and the area fraction of retained austenite was determined by measuring diffraction intensities of γ(111), (200), (220) planes with an X-ray diffraction apparatus.

Ferrite Area Fraction and Average Grain Diameter

A section of steel sheet in parallel with the rolling direction was mirror polished and thereafter subjected to Nital etching to be observed with a scanning electron microscope so that the area fraction and average grain diameter of ferrite were determined by an intercept method from secondary electron images with magnifications of 1000 and 2000.

Bainite Area Fraction

The area fraction of bainite was calculated by subtracting the area fractions of martensite, retained austenite and ferrite, which were measured by the above described methods, from the entire structure (100%).

Average Nano Hardness

Nano hardness of bainite and martensite was determined by a nanoindentation method. A portion at a depth of ¼ sheet thickness in a cross section of steel sheet in parallel with the rolling direction was polished with emery paper, and thereafter mechanochemically polished with colloidal silica, and further the affected layer was removed by electrolytic polishing to be subjected to testing. The nanoindentation method was carried out by using a Berkovich type indenter at a indentation load of 500 μN. The used test apparatus was Triboscope manufactured by Hysitron, and the indentation size at that time was not larger than 0.1 μm in diameter. Nano hardness was measured at randomly selected 20 points for each phase of bainite and martensite to determine an average nano hardness for each. Average nano hardness of bainite and martensite was determined for before 10% tensile deformation and after deformation by the above described method.

Axial Crash Test

Each steel sheet was used to fabricate a rectangular tubular member by bending and welding, and an axial crash test in which the collision speed in the axial direction was 64 km/h was carried out to evaluate collision absorbing performance. The section of the rectangular tubular member perpendicular to the axial direction was an octagonal shape, the axial direction length of the rectangular tubular member was 200 mm, and the axial direction thereof was perpendicular to the rolling direction.

An average crash load and a stable buckling ratio were investigated for a case in which a sectional shape factor (Wp/t), which was defined by using the length (Wp) of one side of the regular octagon (the length of a straight portion excepting the curved portions of corner portions) of the rectangular tubular member and the sheet thickness (t) of steel sheet, was 20 and 16.

The axial crash test was carried out such that an impact weight made of steel and having a weight of 230 kg was made to free fall from above each rectangular tubular member which was fixed in an upright position to collide against the member at a speed of 64 km/h causing the test sample to be buckled to the axial direction. The evaluation of test was carried out based on the load at the time of axial crash (crash load) and the presence or absence of cracking. The axial crash test was carried out on 3 to 10 test samples for each steel sheet to determine an average crash load. A stable buckling ratio is the proportion of the number of test samples in which no cracking occurred by the axial crash test with respect to the total number of test samples.

In general, as the sectional shape factor (Wp/t) decreases, the absorption of impact energy improves. However, as the sectional shape factor (Wp/t) decreases, the amount of plastic deformation work per unit crash amount increases. For that reason, cracking becomes more likely to occur in the course of crash, and there may be a case in which consequently the amount of plastic deformation work cannot be increased, and therefore the absorption of impact energy cannot be improved.

Under the present crash test conditions, when Wp/t=20, the average crash load is preferably at least 0.30 kN/mm$^2$, and the stable buckling ratio is preferably at least 80%. Moreover, when Wp/t=16, the average crash load is preferably at least 0.35 kN/mm$^2$, and the stable buckling ratio is preferably at least 30%.

Table 4 shows data relating to microstructures and nano hardness, and Table 5 shows data relating to mechanical properties.

TABLE 4

| Cold Rolling Test Number | Martensite Fraction (%) | Retained γ Amount (%) | Bainite Fraction (%) | Ferrite Fraction (%) | Ferrite Grain Diameter (μm) | $H_{M0}/H_{B0}$ | $(H_{M10}/H_{M0})/(H_{B10}/H_{B0})$ | Category |
|---|---|---|---|---|---|---|---|---|
| 1 | 13.7 | 4.3 | 12 | 70 | 6.5 | 2.8 | 0.5 | Compar. |
| 2 | 23.0 | 9.7 | 62.3 | 5 | 2.2 | 1.4 | 1.03 | Invent. |
| 3 | 0.0 | 0.0 | 48.0 | 52 | 5.8 | — | — | Compar. |
| 4 | 20.0 | 10.8 | 51.2 | 18 | 2.1 | 1.4 | 1.08 | Invent. |
| 5 | 13.0 | 9.3 | 66.8 | 10.9 | 1.1 | 1.1 | 1.14 | Invent. |
| 6 | 20.0 | 12.5 | 55.0 | 12.5 | 4.1 | 1.4 | 1.2 | Invent. |
| 7 | 65.0 | 6.0 | 6.0 | 23 | 4.2 | 2.0 | 0.86 | Compar. |
| 8 | 14.1 | 12.1 | 71.8 | 2 | 2.8 | 1.32 | 1.05 | Invent. |
| 9 | 5.1 | 3.0 | 86.9 | 5 | 2.2 | 1.55 | 1.03 | Invent. |
| 10 | 10.0 | 12.9 | 66.0 | 11.1 | 2.5 | 1.3 | 1.28 | Invent. |
| 11 | 20.0 | 0.3 | 6.7 | 73 | 3.0 | 1.0 | 1.2 | Compar. |
| 12 | 5.0 | 0.0 | 36.8 | 58.2 | 5.3 | 2.5 | 0.71 | Compar. |
| 13 | 5 | 7.0 | 88.0 | 5.0 | 4.2 | 1.4 | 1.1 | Invent. |

TABLE 5

| Cold Rolling Number | YS (MPa) | TS (MPa) | 5% Flow Stress (Mpa) | u-El (%) | HER (%) | u-El × HER (%$^2$) | Average Crash Load (kN/mm$^2$) Wp/t = 20 | Average Crash Load (kN/mm$^2$) Wp/t = 16 | Stable Buckling Ratio (%) Wp/t = 20 | Stable Buckling Ratio (%) Wp/t = 16 | Category |
|---|---|---|---|---|---|---|---|---|---|---|---|
| 1 | 500 | 1013 | 550 | 11.7 | 35 | 410 | 0.25 | — | 66 | — | Compar. |
| 2 | 766 | 1036 | 1056 | 11.5 | 53 | 606 | 0.35 | — | 100 | — | Invent. |
| 3 | 570 | 830 | 845 | 11.0 | 40 | 440 | 0.30 | 0.34 | 100 | 66 | Compar. |
| 4 | 736 | 1129 | 1147 | 9.7 | 45 | 436 | 0.37 | — | 100 | — | Invent. |
| 5 | 803 | 1086 | 1074 | 8.0 | 59 | 469 | — | 0.38 | — | 100 | Invent. |
| 6 | 663 | 1085 | 922 | 8.5 | 43 | 366 | 0.34 | 0.38 | 100 | 66 | Invent. |
| 7 | 640 | 1200 | 1148 | 10.0 | 17 | 170 | 0.34 | — | 25 | — | Compar. |
| 8 | 802 | 1053 | 1008 | 10.5 | 50 | 527 | 0.35 | — | 90 | — | Invent. |
| 9 | 787 | 927 | 913 | 7.7 | 85 | 655 | 0.34 | — | 100 | — | Invent. |
| 10 | 632 | 986 | 990 | 6.4 | 70 | 448 | 0.35 | — | 80 | — | Invent. |
| 11 | 364 | 560 | 530 | 14.0 | 115 | 1610 | 0.25 | — | 100 | — | Compar. |
| 12 | 422 | 727 | 716 | 12.5 | 50 | 625 | 0.28 | — | 100 | — | Compar. |
| 13 | 670 | 1090 | 1073 | 8.0 | 54 | 432 | — | 0.42 | — | 33 | Invent. |

As shown in Table 5, the steel sheets relating to the present invention exhibited products of uniform elongation and hole expansion ratio (u-El×HER) was at least 300%$^2$, and 5% effective flow stress was at least 900 MPa. Accordingly, a rectangular tubular member which uses a steel sheet according to the present invention showed that average loads by axial crash at a sectional shape factor Wp/t=20 were as high as at least 0.34 kN/mm². Further, stable buckling ratios at a sectional shape factor Wp/t=20 were at least 80%, and stable buckling ratios at a sectional shape factor Wp/t=16 were at least 30% showing a high resistance to cracking due to axial crash.

As seen from comparative examples, when either of 5% flow stress and u-El×HER vales did not satisfy the conditions specified in the present invention, the average crash load or the stable buckling ratio was low.

The invention claimed is:

1. A method for manufacturing a steel sheet having a microstructure containing, by area %, bainite: more than 50%, martensite: at least 3% and at most 30%, and retained austenite: at least 3% and at most 15%, the remainder consisting of ferrite having an average grain diameter of less than 5 µm; and mechanical properties in which the product of uniform elongation and hole expansion ratio is at least 300%², and an effective flow stress when 5% true strain is applied is at least 900 MPa, comprising following steps (A) to (C):

(A) a hot rolling step in which a slab having a chemical composition containing, by mass %, C: at least 0.08% and at most 0.30%, Mn: at least 1.5% and at most 3.5%, Si+Al: at least 0.50% and at most 3.0%, P: at most 0.10%, S: at most 0.010%, N: at most 0.010%, Cr: 0 to at most 0.5%, Mo: 0 to at most 0.5%, B: 0 to at most 0.01%, Ti: 0 to less than 0.04%, Nb: 0 to less than 0.030%, V: 0 to less than 0.5%, Ca: 0 to at most 0.010%, Mg: 0 to at most 0.010%, REM: 0 to at most 0.050%, and Bi: 0 to at most 0.050%, the remainder being Fe and impurities is subjected to multi-pass hot rolling in which rolling is completed at a temperature of at least Ar₃ point, the obtained steel sheet is cooled to a temperature range of at least 620° C. and at most 720° C. under a cooling condition in which cooling is started within 0.4 seconds after completion of rolling, and an average cooling rate is at least 600° C./sec, as well as a time required for cooling from completion of rolling in a rolling pass which is two passes before the last rolling pass to 720° C. is at most 4 seconds, and the steel sheet is held in the temperature range for at least 1 second and at most 10 seconds, thereafter being cooled to a temperature range of at least 300° C. and at most 610° C. at an average cooling rate of at least 10° C./sec and at most 100° C./sec, and being wound up to obtain a hot-rolled steel sheet;

(B) a cold rolling step in which the hot-rolled steel sheet obtained by the hot rolling step is subjected to cold rolling of a rolling reduction of at least 40% and at most 70% to be formed into a cold-rolled steel sheet; and (C) an annealing step in which the cold-rolled steel sheet obtained by the cold rolling step is subjected to a heat treatment in which the steel sheet is held in a temperature range of at least (Ac₃ point−30° C.) and at most (Ac₃ point +100° C.) for at least 10 seconds and at most 300 seconds, and then is cooled at an average cooling rate of at least 15° C./sec in a temperature range of at least 500° C. and at most 650° C., thereafter being held in a temperature range of at least 300° C. and at most 500° C. for at least 30 seconds and at most 3000 seconds.

2. The method set forth in claim 1, wherein the microstructure satisfies the following formulas (1) and (2):

$$1.2 \leq H_{M0}/H_{B0} \leq 1.6 \quad (1)$$

$$0.9 \leq \{(H_{M10}/H_{M0})/(H_{B10}/H_{B0})\} \leq 1.3 \quad (2)$$

where, $H_{M0}$: initial average nano hardness of the martensite, $H_{B0}$: initial average nano hardness of the bainite, $H_{M10}$: average nano hardness of the martensite after 10% tensile deformation, $H_{B10}$: average nano hardness of the bainite after 10% tensile deformation.

3. The method set forth in claim 1, wherein
the chemical composition contains one or more selected from Cr: at least 0.1% and at most 0.5%, Mo: at least 0.1% and at most 0.5%, and B: at least 0.0010% and at most 0.01%.

4. The method set forth in claim 1, wherein
the chemical composition contains one or more selected from Ti: at least 0.01% and less than 0.04%, Nb: at least 0.005% and less than 0.030%, and V: at least 0.010% and less than 0.5%.

5. The method set forth in claim 1, wherein
the chemical composition contains one or more selected from Ca: at least 0.0008% and at most 0.010%, Mg: at least 0.0008% and at most 0.010%, REM: at least 0.0008% and at most 0.050%, and Bi: at least 0.0010% and at most 0.050%.

* * * * *